US006948077B1

(12) United States Patent
Pitale

(10) Patent No.: US 6,948,077 B1
(45) Date of Patent: Sep. 20, 2005

(54) ATM/ALERT

(76) Inventor: J. Michael Pitale, 24 Shannon Ct., Medford, NJ (US) 08055

( * ) Notice: Subject to any disclaimer, the term of this patent is extended or adjusted under 35 U.S.C. 154(b) by 745 days.

(21) Appl. No.: 09/516,564

(22) Filed: Jun. 6, 2000

(51) Int. Cl.[7] .................................................. H04L 9/00

(52) U.S. Cl. ....................................... 713/202; 235/379

(58) Field of Search ......................... 713/202; 235/379

(56) References Cited

U.S. PATENT DOCUMENTS 5,354,974 A * 10/1994 Eisenberg ................... 235/379
5,731,575 A * 3/1998 Zingher et al. ............. 235/379

OTHER PUBLICATIONS

IBM Technical Disclosure Bulletin, Alert Pin for Personal Banking Terminals NN9305309, May 1, 1993, vol. 36, issue 5, pp. 309-312.*

* cited by examiner

*Primary Examiner*—Gregory Morse
*Assistant Examiner*—Jacob Lipman
(74) *Attorney, Agent, or Firm*—Licata & Tyrrell P.C.

(57) ABSTRACT

Computer security protection referred to herein as ATM/ALERT is provided. This system interacts with established software to recognize a valid identification which will then allow a requested action such as an ATM transaction to occur. The system also interacts with the established software to recognize an alert signal issued by the user who is under duress which will then activate security measures via the established software. Exemplary identifications include a PIN number, iris scan, thumb print or facial scan. In some embodiments, the computer security protection requires first-time entry of a valid identification and second-time entry of a valid identification to allow the requested action.

2 Claims, 1 Drawing Sheet

ATM/ALERT

FIELD OF THE INVENTION

A computer security protection for responsive action to ATM transactions and other security accesses made under duress, referred to herein as ATM/ALERT, is provided for use with different types of identification including, but not limited to personal identification numbers or PIN numbers, iris scans, thumb prints and/or facial scans.

DESCRIPTION OF RELATED ART

U.S. Pat. No. 5,354,974 discloses an ATM machine with a computer which receives a PIN, determines if the PIN is an alternate PIN from the user which is under duress and activates an alarm if it is an alert PIN. The system can require two forms of identification.

SUMMARY OF THE INVENTION

An object of the present invention is to provide computer security protection for ATM transactions and other security accesses comprising an ATM/ALERT system which interacts with established software to recognize a valid identification which will then allow the requested action to occur via the established software and an alert signal issued by the user who is under duress which will then activate security measures such as a silent alarm or another appropriate action via the established software.

DETAILED DESCRIPTION OF THE INVENTION

Figure 1:
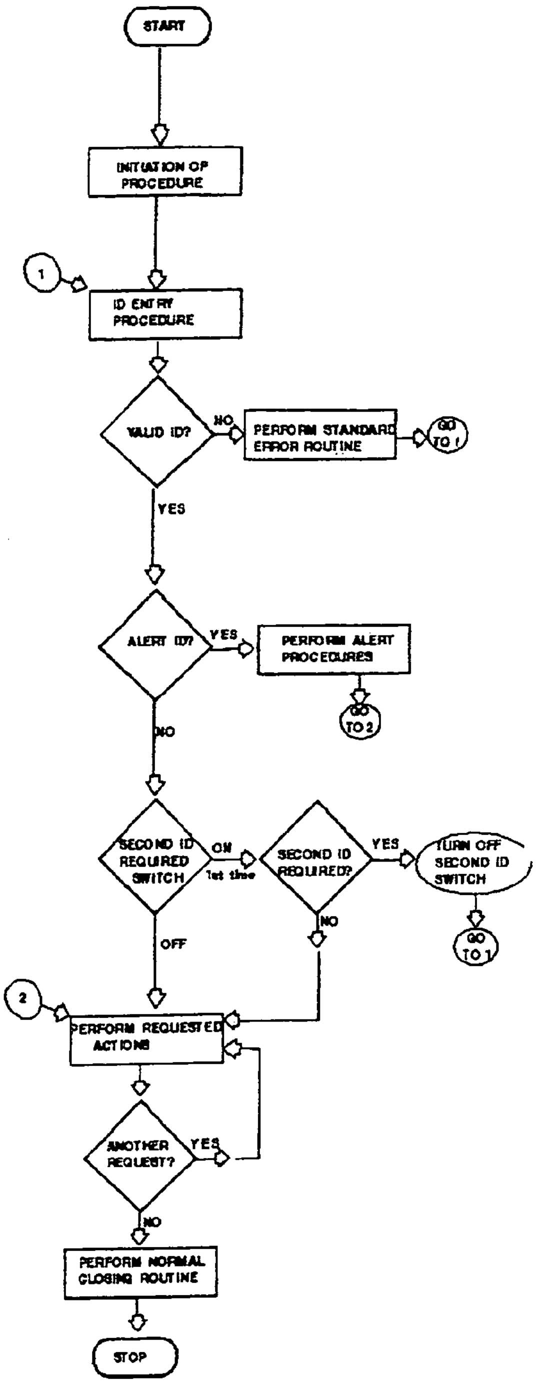
FIG. 1 provides a schematic flowchart of exemplary steps of one embodiment of an ATM/ALERT system of the present invention.

The present invention relates to computer security protection for responsive action to ATM transactions and other security accesses referred to herein as the ATM/ALERT system. The ATM/ALERT system of the present invention has two functions. The system recognizes a valid identification which will then allow the requested action, e.g. an ATM transaction, access to a secured area, etc. to occur. The system also recognizes an alert signal issued by the user who is under duress which will then activate security measures such as a silent alarm or another appropriate action. In some embodiments, the requested function is allowed to prevent a warning that the alarm has been activated.

To use the ATM/ALERT system, at least two types of identification methods are required, a valid identification method and an alert signal. Exemplary identification methods include, but are not limited to, PIN numbers, iris scans, thumb prints and facial scans. These two identification methods may be any two methods, not necessarily the same. For example, a valid identification might be an iris scan that could be combined with the alert signal generated by the entering of an alert PIN number. Additional examples are discussed in the Examples section herein.

Selection of type of identification, appropriate action and so forth are the choice of the user company or network and may even vary from user to user.

As schematic flow chart of an exemplary ATM/Alert system of the present invention is depicted in FIG. 1. As shown in FIG. 1, in this embodiment, the ATM/ALERT system is initiated by insertion of the ATM card and pressing of a start button or key. Identification, such as in the form of a personal identification number or PIN number, iris scan, thumb print or facial scan is then entered. This is referred to herein as the first-time entry of identification. The system then determines if the first-time entry of identification is recognizable as belonging to an individual. Both valid identification and alert signals must pass this test. Otherwise a standard error routine is performed and re-entry of the first-time entry of identification is required. If the system determines that the first-time entry of identification is recognizable as belonging to an individual then it determines whether the first-time entry of identification is a valid identification or an alert signal. If the first-time entry of identification is an alert signal, the system performs alert procedures such as signaling the performance of an alarm. In a preferred embodiment, the alarm is silent. The system then moves on to normal procedures of performing the requested actions to give the appearance of normal conditions. If the first-time entry of identification is a valid identification the system determines if a second-entry of identification is required in the user profile. If a second entry of identification is not required, the system performs the action requested. For example, the ATM transaction proceeds or entry through a security door is permitted. If a second-entry of identification is required, the steps of identification entry and assessment of valid identification versus alert signal are repeated. As shown in FIG. 1, in this embodiment, the ATM/ALERT system also has the capabilities of performing a second request such as another ATM transaction and performing associated closing actions such as an audit log recording or a security log entry.

Depending on the method of providing identification, the first-entry of identification may be sufficient to provide a valid identification or an alert signal. For example, if two PIN numbers are used, one for valid identification and the other for an alert signal, the first-time entry of a PIN number would be sufficient to determined if this is a valid identification or the alert signal and the second-time entry would not be needed.

However, in some embodiments, the first-time entry of identification such as an iris scan may not by itself have enough ability to signal a valid identification versus an alert condition. In these embodiment, a second-time entry of another identification such as PIN number may also be required to signal the status. A valid iris scan combined with a valid PIN number would grant the requested action, while a valid iris scan combined with an alert PIN number would signal the alert status. Thus, in some embodiments of the present invention a second identification is required as part of the ATM/ALERT system.

ATM/ALERT is coded in two main-frame languages, COBOL and Assembler. However, it is easily translatable into any other media including coding for the P/C environment.

The ATM/ALERT system of the present invention performs "traffic control" for most of the already-in-place computer activity. The system goes back and forth with functions such as acquiring the identification and checking for valid identification versus alert signals with the established software. Then the valid identification versus alert signal status indication is passed from the established software back to the ATM/ALERT which will make the determination of returning control to the established function to allow the requested action or notifying the established software to activate the appropriate alert action. ATM/

ALERT traffic control functions could also be incorporated directly into the already established software coding with little effort.

The following nonlimiting examples are provided to further illustrate the present invention.

EXAMPLE 1

First-time Entry of PIN Number

A PIN number is used for the first-time entry of identification. It would be checked against two PIN numbers, one valid and the other an alert signal to determine status. If a valid number, the requested action is performed. If it is the alert number, the alert action is performed. In this example only a first-time entry of identification is needed.

EXAMPLE 2

First-time Entry of Iris Scan

An iris scan is used for the first-time entry of identification. If there is the possibility of being able to use both the left and the right eye for different iris scans, then the right eye can be used for the first-time entry of valid identification and the left eye used for the alert signal or vice versa. In this example both the valid identification and the alert signal can be identified by the same method of the iris scan. Similar to Example 1, in this example only first-time entry of identification is needed.

EXAMPLE 3

Iris Scan and PIN Number

An iris scan can be used for the first-time entry of identification. When there is not the possibility of using both eyes as in example 2, second-time entering of identification may be required either as a valid second-time entry of identification or as an alert signal. For example second-time entry of a PIN number can serve as additional validation or an alert signal. In this example, an indicator would be in the user profile to signal that a second-time entry of identification is required.

EXAMPLE 4

Facial Scans

Indication of a requirement for the need for a second-time entry of identification may also be appropriate when a facial scan is used for first-time entry of identification. In this situation, a second-time entry of identification would be required. The second-time entry of identification could include entering of a valid PIN number or an alert signal or a thumb print (right for valid, left for alerts, or vice versa).

What is claimed is:

1. A computer security protection system for responsive action to ATM transactions and other security accesses made under duress, said system interacting with established software to:

(a) recognize first-entry of a valid identification, which matches a stored valid identification, (b) determine if a second-entry of another different valid identification is required in a user profile wherein;

(i) if second-entry of another valid identification is not required, a requested action is allowed to occur via the established software; and (ii) if second entry of another valid identification is required, second-entry of another valid identification is requested followed by recognition of second-entry of another valid identification to allow a requested action to occur via the established software; and (c) recognize an alert signal issued by a user who is under duress wherein said alert signal activates security measures via the established software.

2. The computer security protection system of claim 1 wherein first-entry and second-entry of valid identifications comprise a PIT number, iris scan, thumb print or facial scan.

* * * * *